United States Patent
Ortiz

(10) Patent No.: US 8,030,789 B2
(45) Date of Patent: Oct. 4, 2011

(54) WAVE TURBINE

(75) Inventor: Israel Ortiz, Guayama, PR (US)

(73) Assignee: Israel Ortiz, Guayama, PR (US)

( * ) Notice: Subject to any disclaimer, the term of this patent is extended or adjusted under 35 U.S.C. 154(b) by 561 days.

(21) Appl. No.: 12/291,362

(22) Filed: Nov. 7, 2008

(65) Prior Publication Data

US 2010/0117365 A1 May 13, 2010

(51) Int. Cl.
*F03B 13/10* (2006.01)
*F03B 13/00* (2006.01)

(52) U.S. Cl. .......................................... 290/43; 290/42

(58) Field of Classification Search .................. 290/42, 290/43, 53, 54; 60/398, 325, 497, 698, 498, 60/641.7; 405/75, 76; 415/3.1, 210.1; 406/191, 406/192; 366/165.1, 165.2
See application file for complete search history.

(56) References Cited

U.S. PATENT DOCUMENTS

| | | | | |
|---|---|---|---|---|
| 4,098,081 A | * | 7/1978 | Woodman | 60/398 |
| 5,551,237 A | * | 9/1996 | Johnson | 60/641.8 |
| 6,939,088 B2 | * | 9/2005 | Farrell | 406/192 |
| 7,355,298 B2 | * | 4/2008 | Cook | 290/53 |
| 7,579,700 B1 | * | 8/2009 | Meller | 290/43 |
| 7,830,032 B1 | * | 11/2010 | Breen | 290/53 |
| 7,900,452 B2 | * | 3/2011 | Howard et al. | 60/641.7 |
| 7,963,111 B2 | * | 6/2011 | Doleh et al. | 60/497 |
| 2009/0121481 A1 | * | 5/2009 | Riley | 290/43 |
| 2011/0000211 A1 | * | 1/2011 | Benik | 60/641.7 |

OTHER PUBLICATIONS

U.S. Appl. No. 12/152,908, filed May 19, 2008, Israel Ortiz, pp. 2-10, p. 18.

* cited by examiner

*Primary Examiner* — Julio Gonzalez

(57) ABSTRACT

An wave turbine composed of a omnidirectional turbine (or Double Wind Turbine) that is used with two tanks and a connecting tube between the two tanks. This omnidirectional turbine is placed in the middle of the connecting tube in a vertical axis position. The two tanks are placed a half wave length apart from the center to the center of each tank. Since the two tanks are a half water wave apart, than as water level of one of the tank rises the other water level on the other tank will go to lower and vise versa. This action will cause a back and forward motion of compressed air through the connecting tube. This compressed air will go through the omnidirectional turbine and cause a unidirectional rotation of the omnidirectional turbine. A axle connected to the omnidirectional turbine will transfer the energy to a generator to produce power output.

19 Claims, 11 Drawing Sheets

WAVE TURBINE

RELATED APPLICATIONS

The present application is related to U.S. Pat. No. 12/152,908, issued Oct. 5, 2008, included by reference herein.

FIELD OF THE INVENTION

The present invention relates to a wave turbine composed of a omnidirectional turbine (or Double Wind Turbine) and, more particularly, to the application of generating power from water waves.

BACKGROUND OF THE INVENTION

It is well known that most of the energy is produced from oil and natural gas or coal. The problem is that this sources will not last forever. Also since more nations are becoming industrialized, this sources are in great demand and in part make this sources more expensive. Therefor, the economy of not one nation but of the world is affected.

Also we have the contamination of our air, water, food and the warming of the planet. Therefor we need sources of energy that do not harm our planet and there for mankind. Some of these sources are wind, sun and sea power. Sea power from water waves is clean, renewable, free and can be produced almost on any part of the planet.

In the UK, on the Scottish island of Islay. The limpet (land Installed Marin Powered Energy) uses a similar system. Water waves causes water level in a collector to oscillate up and down and air is forced in and out of a tube connected to this collector. A Wells Turbine will rotate in one direction with the action of the bidirectional air pressure produced here.

This system (The Limpet) is not to effective because it uses the crest or the trough of the wave one at a time. Also since it is open to the atmosphere it very noisy. The present invention uses the trough and the crest of the wave at the same time, there for producing more power. Also it is a close system so it is much quieter.

It is therefore an object of the invention to extract energy from the water waves of any large body of water.

It is another object of the invention to produce clean, renewal energy.

It is another object of the invention to extract this energy in very quiet manner.

It is another object of the invention to produce a very powerful output because of the venturi effect.

It is another object of this invention to use few moving parts.

SUMMARY OF THE INVENTION

In accordance with the present invention, a wave turbine, that is composed of an omnidirectional turbine (or Double Wind Turbine) that is used with two tanks and a connecting tube between the two tanks. The omnidirectional turbine is placed in the middle of the connecting tube in a vertical axis position. The two tanks are placed a half wave length apart from the center to the center of each tank. Since the two tanks are a half water wave apart, than as water level of one of the tank rises the other water level on the other tank will go lower and vice versa. This action will cause a back and forward motion of compressed air through the connecting tube. This compressed air will go through the omnidirectional turbine and cause a unidirectional rotation of the turbine. The output power is transferred to a generator through an axle connected to the omnidirectional turbine. Also since the tanks are much wider than the connecting tube, this increase the force through the turbine because of the venturi effect. This system is very quiet because the air is traveling in a closed path.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
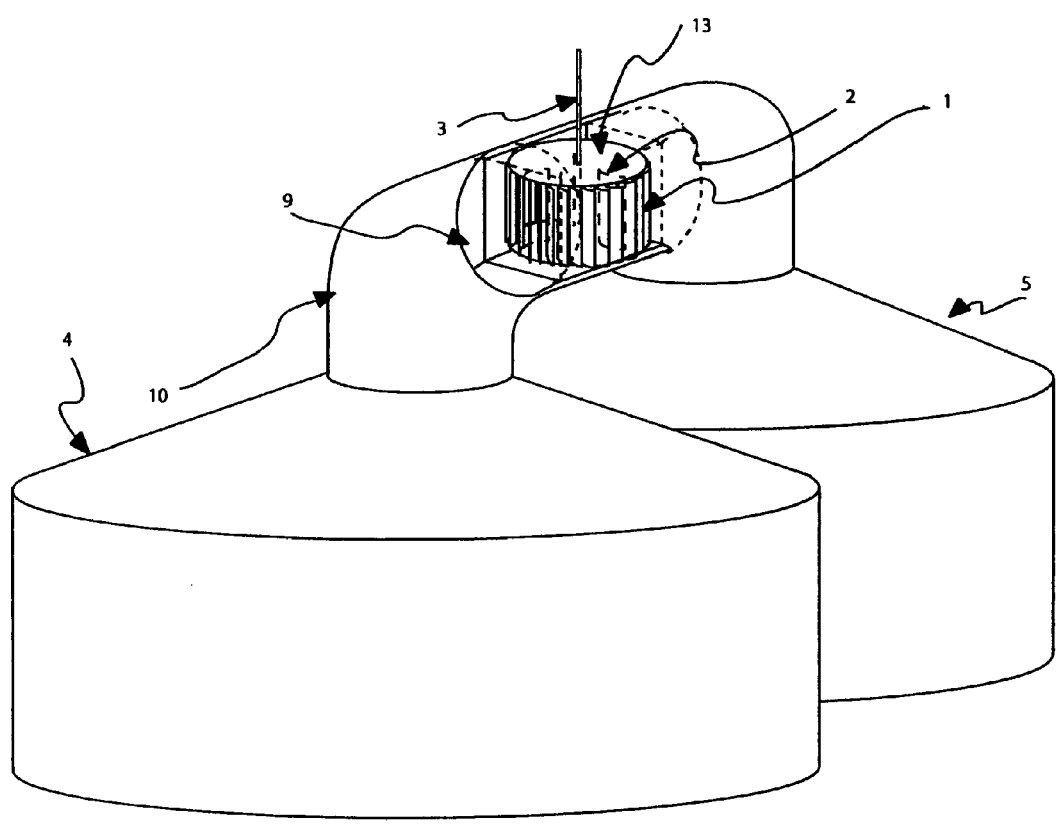
FIG. 1 is a perspective view of a wave turbine composed of a omnidirectional turbine, connecting tube, frame, axle and tanks.
Figure 2:
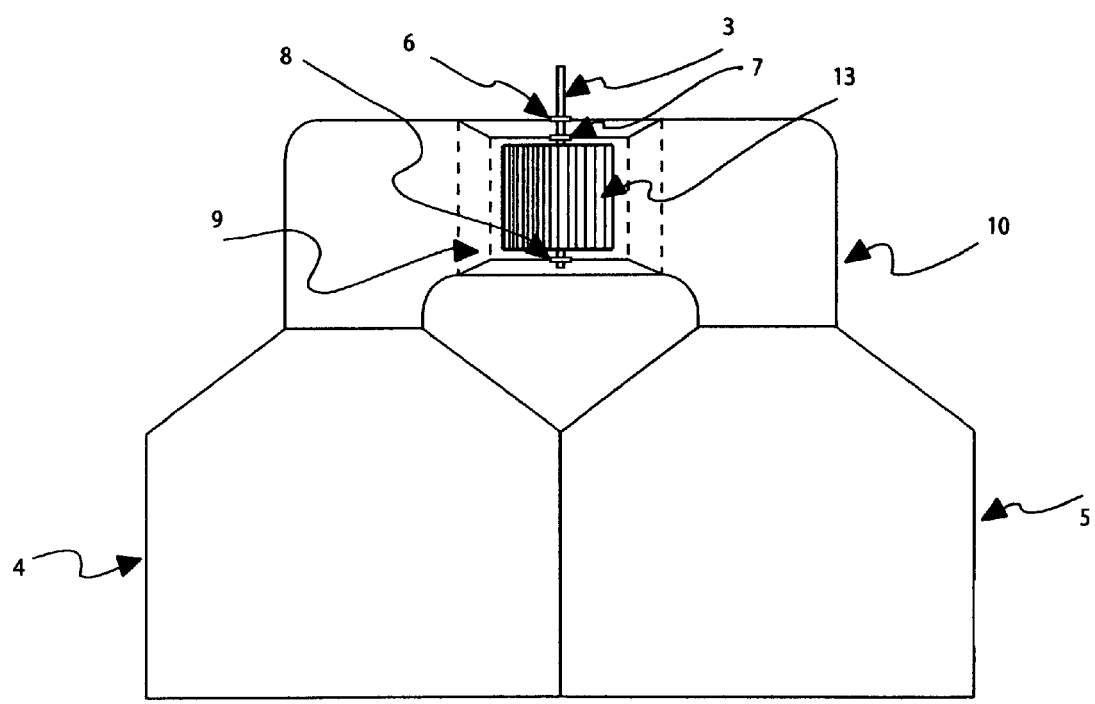
FIG. 2 is a right side view of a wave turbine composed of a omnidirectional turbine, connecting tube, tanks, frame and ball bearings.
Figure 3:
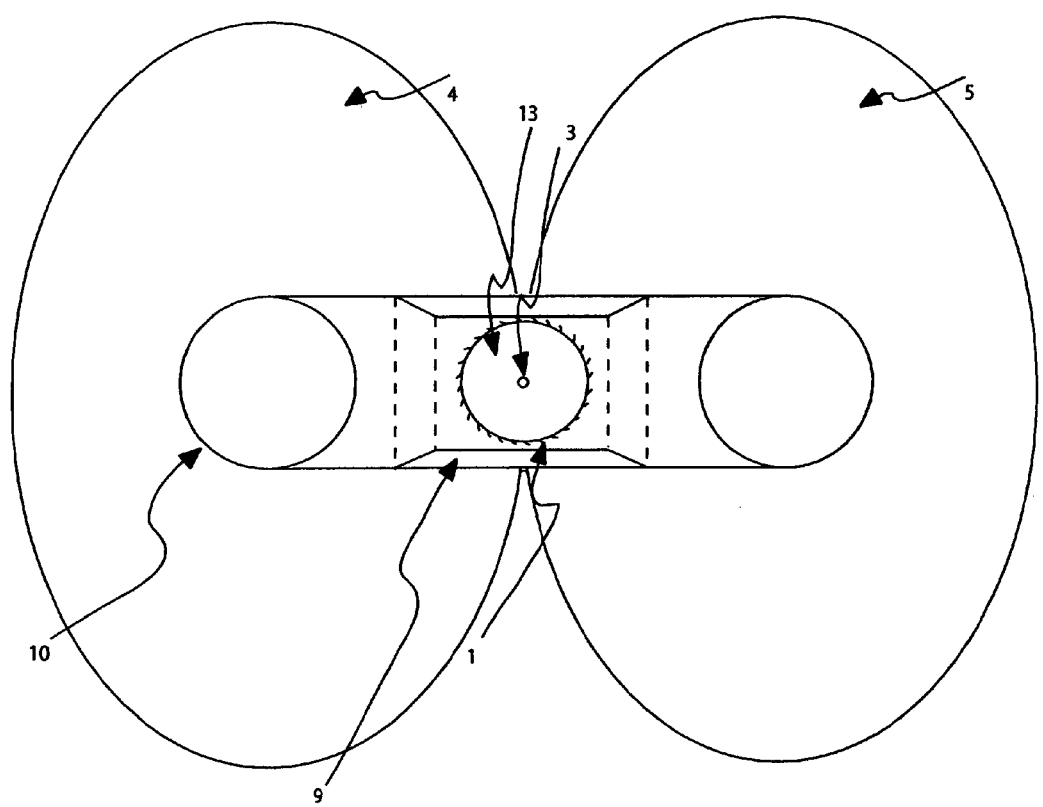
FIG. 3 is a top view of a wave turbine composed of a omnidirectional turbine, connecting tube, frame and tanks.
Figure 5:
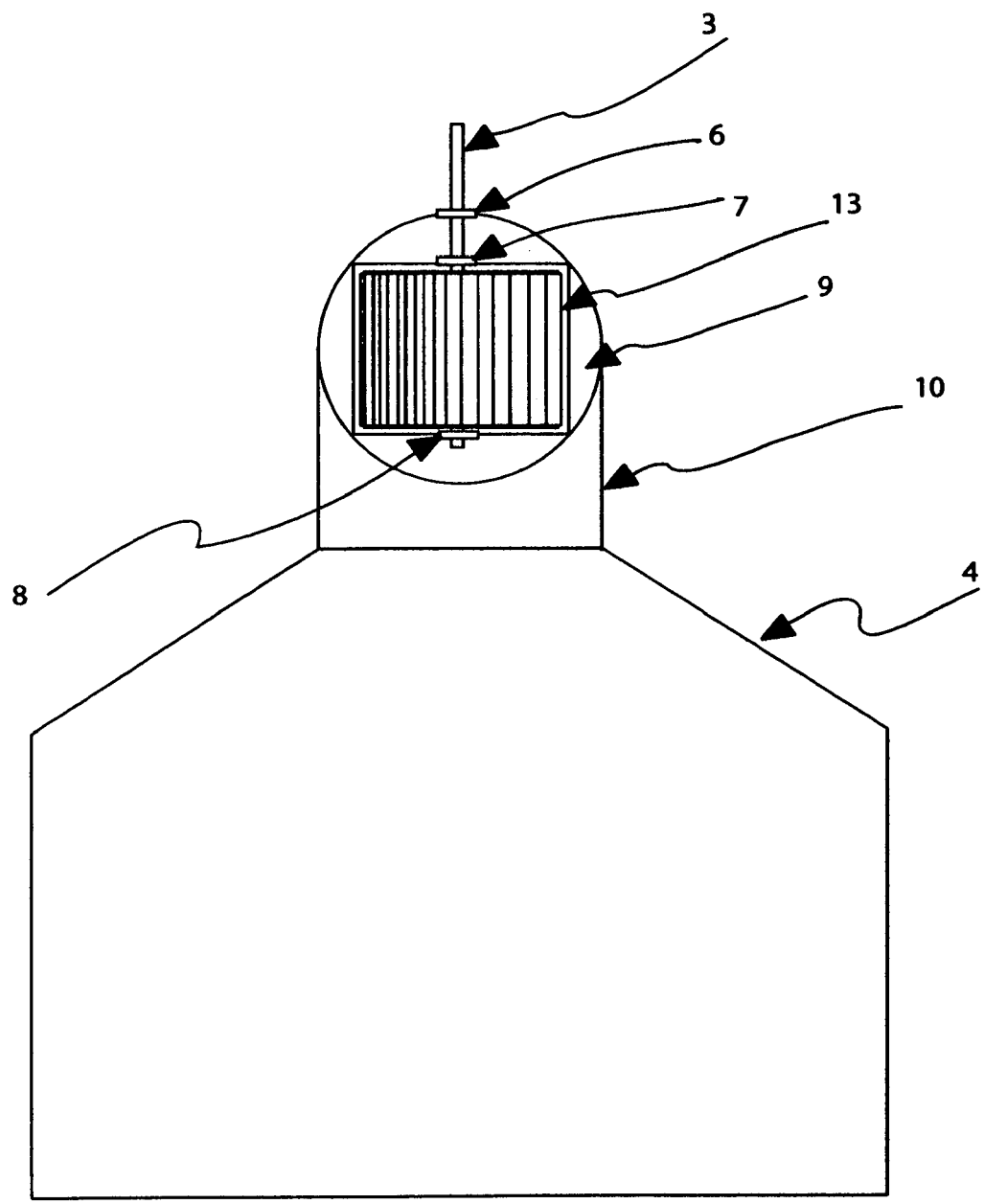
FIG. 5 is a front view of a wave turbine compose of omnidirectional turbine, connecting tube, ball bearings, fame and axle.
Figure 6:
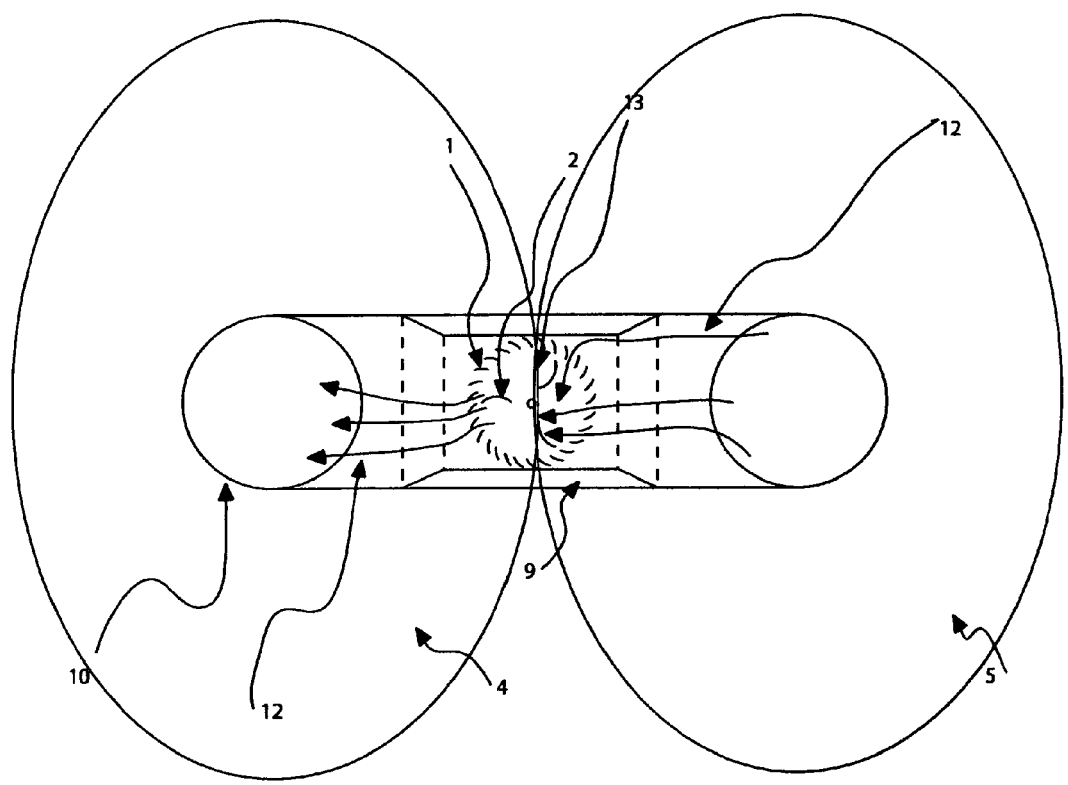
FIG. 6 is a top functional view of a wave turbine with air pressure running from rear tank toward front tank.
Figure 7:
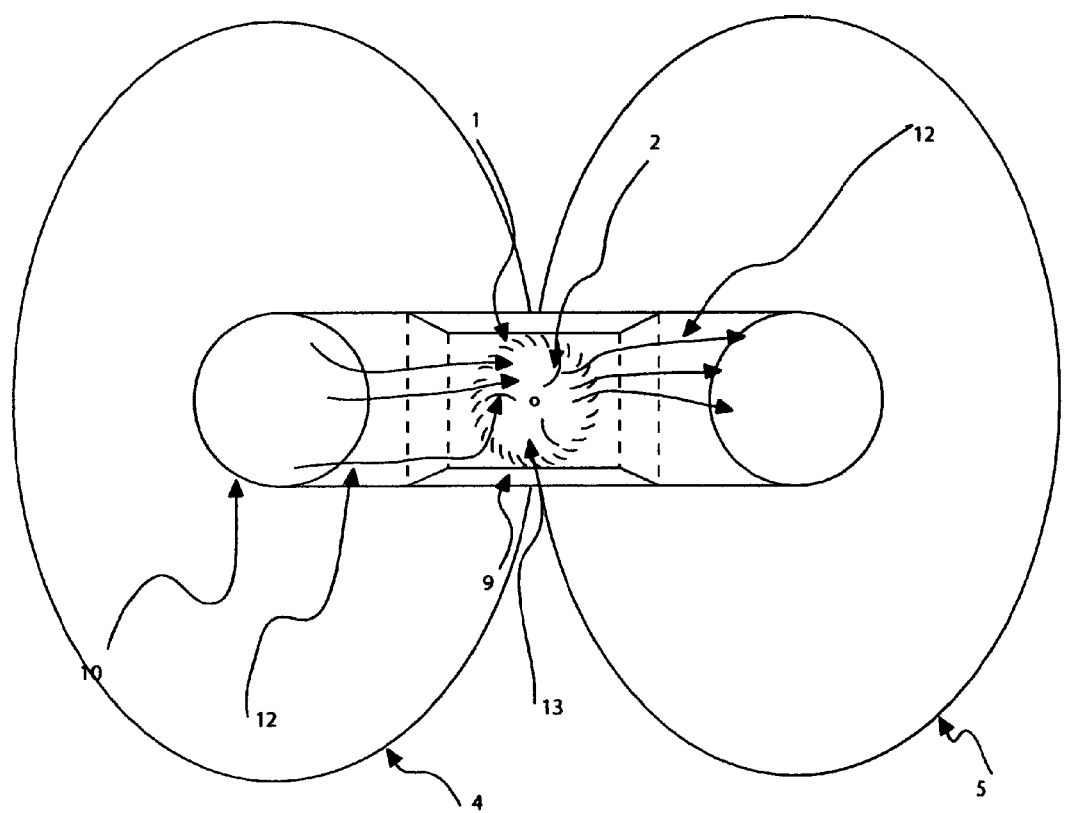
FIG. 7 is a top functional view of a wave turbine with air pressure running from front tank toward rear tank.
Figure 8:
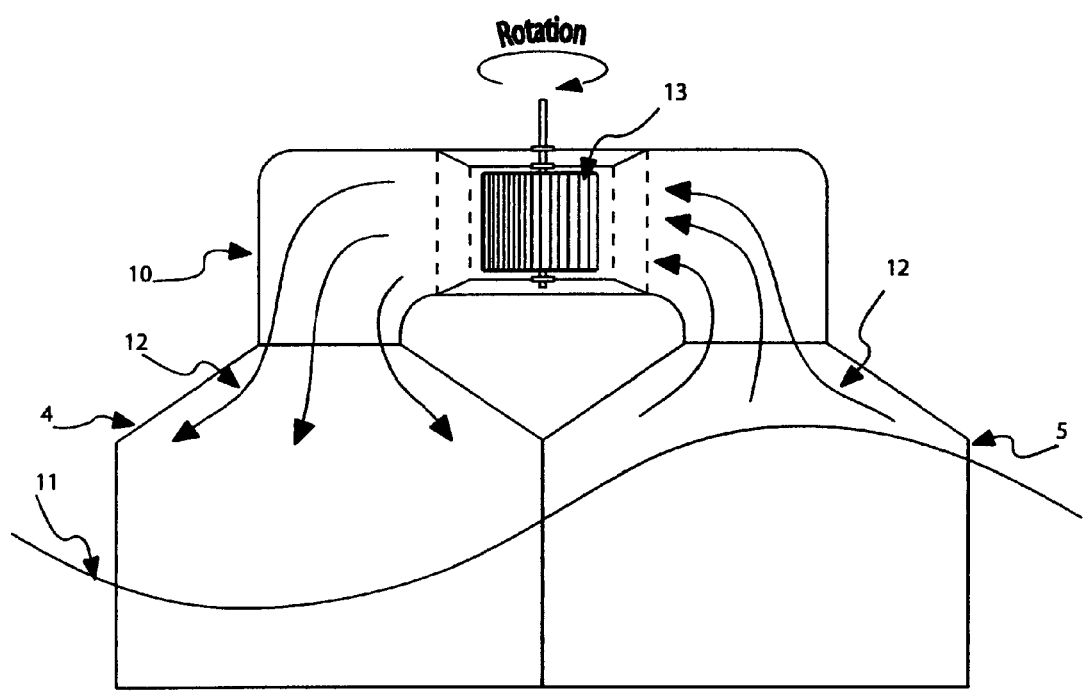
FIG. 8 is a right functional view of a wave turbine with air pressure running from rear tank toward front tank.
Figure 9:
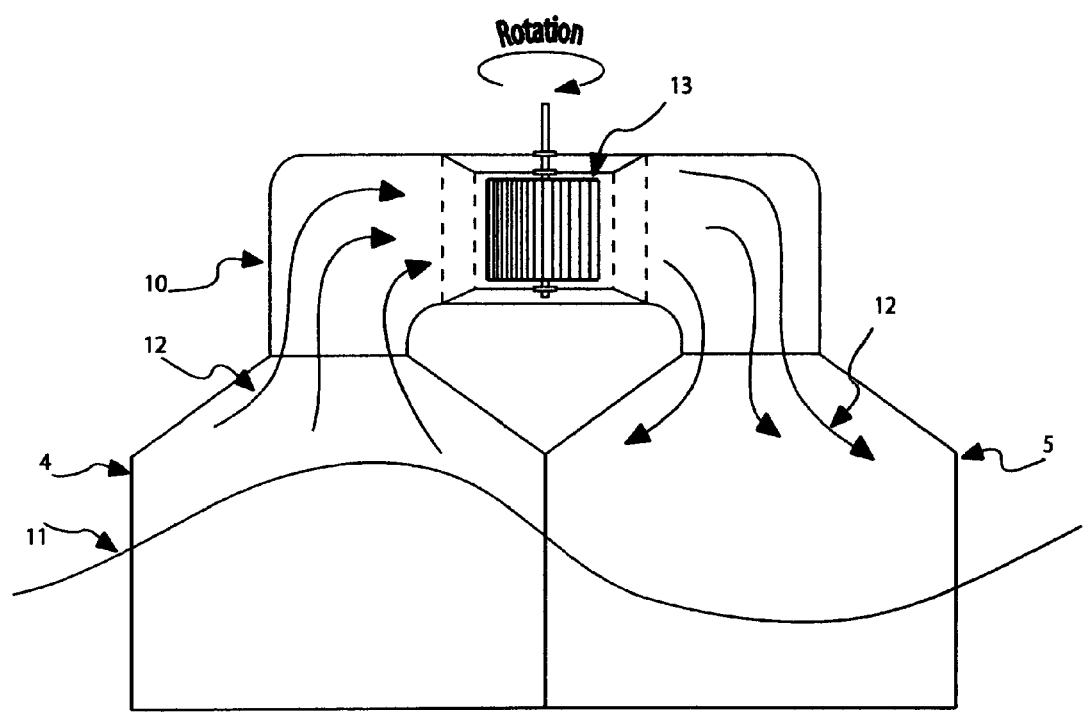
FIG. 9 is a right functional view of a wave turbine with air pressure running from front tank toward rear tank.
Figure 11:
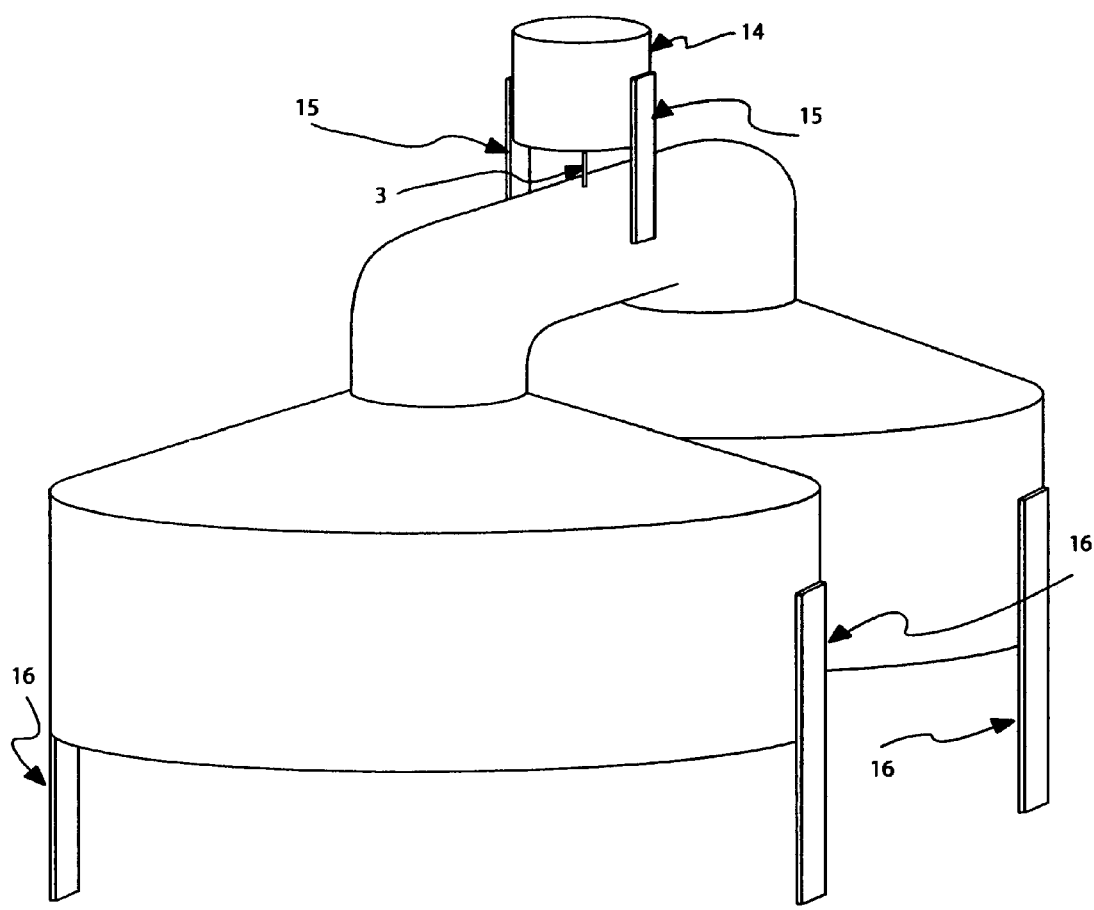
FIG. 11 is a front perspective view of a wave turbine with generator attached by 2 studs. also the wave turbine is held to the ocean floor by 4 supporting legs.

This device is a wave turbine designed with the purpose to produce power output from the energy that the water waves in any large body of water have. FIG. 1 is a perspective view of this wave turbine. FIG. 5 is a front view of the wave turbine. The wave turbine is composed of two tanks, front tank 4 and rear tank 5. The shape of the tanks is elliptical because the waves run parallel to the shore and in this way it is more efficient than a round tank. The two tanks are connected by connecting tube 10 and a omnidirectional turbine 13 (or Double Wind Turbine) is placed in the middle of the connecting tube 10 in a vertical axis position. This arrangement can be seen on FIG. 2 right side and FIG. 3 top view. This tanks are placed at a half wave length apart, measured from center to center of each tank. This is the average length of half water wave 11 from crest to trough on any particular wave on sea shore or large body of water, as seen in FIG. 8. As the water wave 11 travel under the two tanks, this will cause the water level to rise in one of the tanks and go lower in the other tank. When water level in rear tank 5 goes high than water level in the front tank 4 goes low as in FIG. 8. Therefor, the air pressure 12 will flow through the connecting tube 10 and through the omnidirectional turbine 13 from rear tank 5 to front tank 4 as shown in FIG. 6 and FIG. 8. Also when the front tank 4 water level goes high, the rear tank 5 water level goes low as in FIG. 9. There for, the air pressure 12 will flow through the connecting tube 10 and through the omnidirectional turbine 13 from the front tank 4 to the rear tank 5 as shown in FIG. 7 and FIG. 9. This back and forward motion of air pressure 12 will cause the omnidirectional turbine 13 to rotate in one direction. As seen in FIG. 5, the diameter of the tanks is greater than the diameter of the connecting tube 10, there for the speed of air pressure 12 in the connecting tube 10 will be greater than that of the tanks. because of the venturi effect. The output power will be applied to a generator 14 by axle 3 as in FIG. 11. As seen in FIG. 11 the wave turbine is supported by 4 supporting leg 16 to the floor of the ocean. Also as seen in FIG. 11 the generator 14 is attached to the wave turbine by 2 stud 15.

Figure 4:
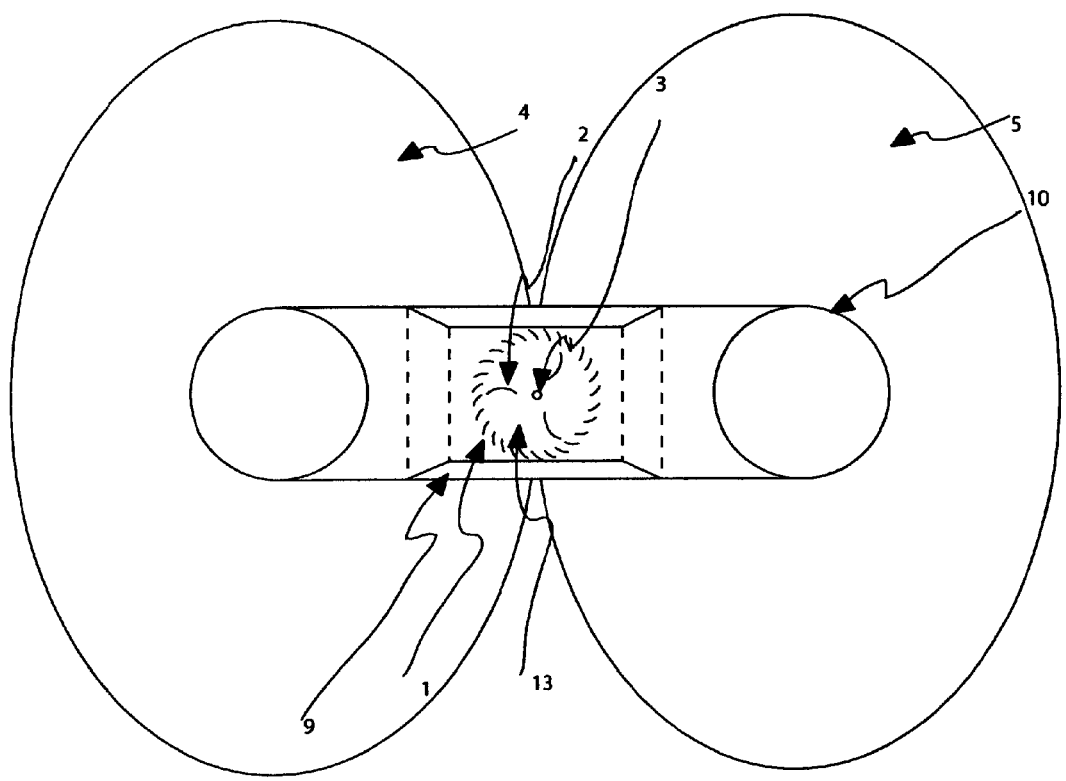
FIG. 4 is a top detail view of a wave turbine composed of a omnidirectional turbine, connecting tube, frame and tanks. Also here we see the inner turbine and the outer turbine that makeup the omnidirectional turbine.
Figure 10:
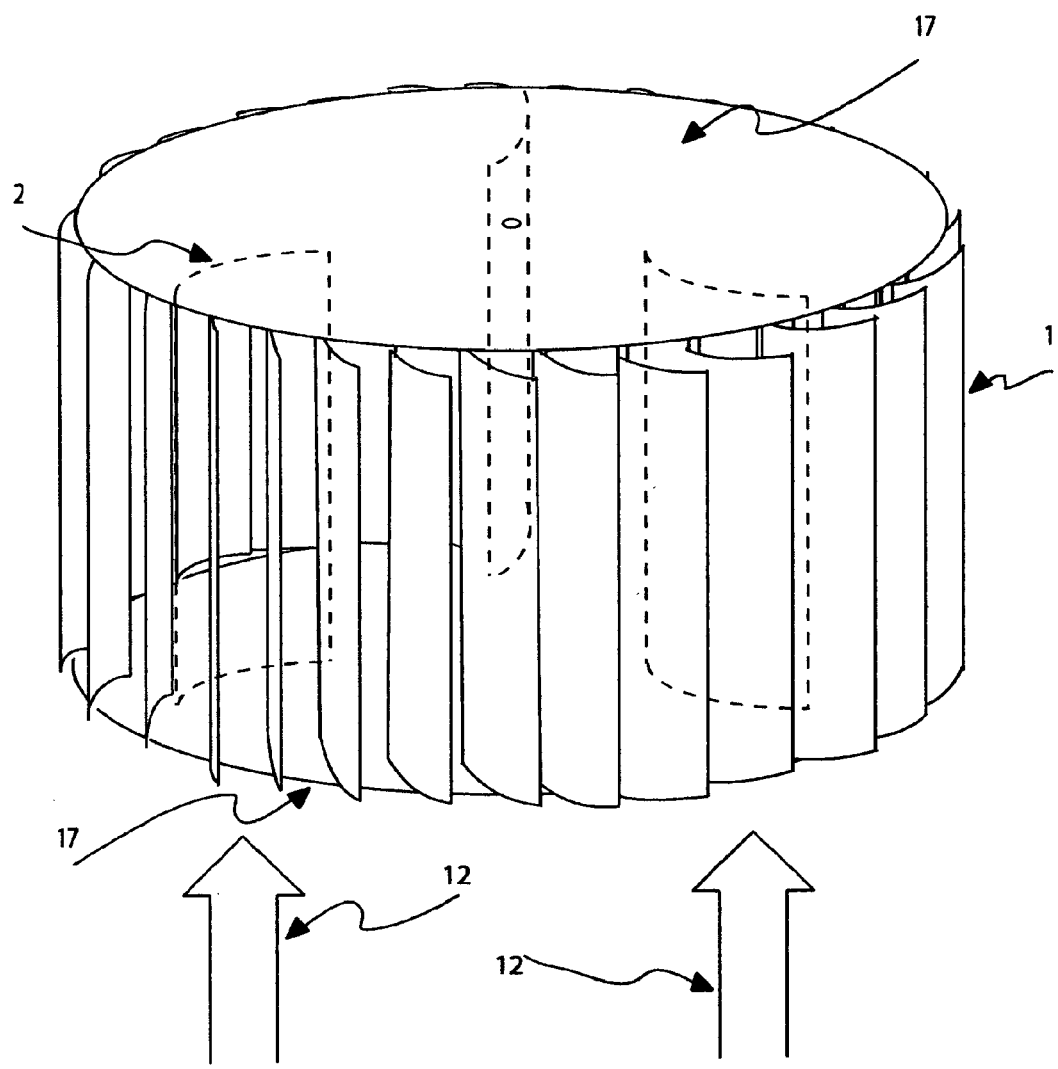
FIG. 10 is a front perspective view of a omnidirectional turbine composed of inner turbine, outer turbine and a top and lower plate that hold together all this parts.

The omnidirectional turbine 13 is designed so that when the air pressure 12 changes direction it will rotate in one direction. This is so because the omnidirectional turbine 13 has two sets of vertical vanes. The inner turbine 2 which is composed of vertical vanes and the outer turbine 1 composed of vertical vanes, which can be seen from the outside of the turbine. Here the inner turbine 2 has three vertical vanes but it could have more vertical vanes. This arrangement can be seen in FIG. 4, FIG. 1 and FIG. 10. The inner turbine 2 will not rotate by it self because the rotation will be cancel or will have very little rotation because the air pressure 12 will the same on the right and on the left side of the turbine. The outer turbine 1 acts like a shield for the inner turbine 2, letting the air pressure 12 hit the inner turbine 2 on the left side. But shielding the right side of the inner turbine 2 as seen on FIG. 7 and FIG. 10. That is, as the inner turbine 2 moves in to the wind or air pressure 12 it is been shield on the right side because the vanes are overlapping, but when the inner turbine 2 move away from the wind or air pressure 12 it is been pushed by the air pressure 12 because the vanes are not overlapping on the left side. The outer turbine 1 could be stationery, but it is better that it moves with the inner turbine 2 so the omnidirectional turbine 13 will have more torque. The frame 9 is used to make the omnidirectional turbine 13 fit the inside of the connecting tube 10. So that the air pressure 12 will not escape between the omnidirectional turbine 13 and the connecting tube 10. The omnidirectional turbine 13 is composed of two plate 17. One on top and one on the bottom. As seen in FIG. 10. This plate 17 hold together the inner turbine 2 and outer turbine 1. This Wave Turbine is designed with one moving part and that is the omnidirectional turbine 13. The upper ball bearing 6, the middle ball bearing 7 and the lower ball bearing 8 is where the omnidirectional turbine 13 and axle 3 will rotate.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A wave turbine for generating power from the wave variation of sea water or any large body of water, comprising:
   means for connecting the two tanks and holding the omnidirectional turbine and directing an air pressure to pass through an omnidirectional turbine;
   means for producing the pressure or vacuum with relation to the water level;
   means for connecting the omnidirectional turbine to a generator;
   means for producing a torque in combination with an outer turbine;
   means for producing torque output in one direction, with bidirectional air pressure;
   means for holding an axle to a connecting tube;
   means for holding the axle to a frame;
   means for holding the axle to the frame;
   means for holding the omnidirectional turbine to the connecting tube and to make the omnidirectional turbine fit the connecting tube, so that air pressure will not leak between the connecting tube and the omnidirectional turbine;
   means for producing vacuum or air pressure with relation to the water level;
   means for the transfer of kinetic energy through the water;
   means for the transfer of energy from the water wave to the omnidirectional turbine;
   means for shielding or passing the air pressure to the inner turbine, and works in connection with an outer turbine to produce torque;
   means for changing mechanical energy to electrical energy;
   means for supporting the wave turbine to the ocean floor;
   means for attaching the generator to the wave turbine; and
   means for holding together the inner turbine and outer turbine that make up the omnidirectional turbine.

2. The wave turbine in accordance with claim 1, wherein said means for connecting the two tanks and holding the omnidirectional turbine and directing the air pressure to pass through the omnidirectional turbine comprises a connecting tube.

3. The wave turbine in accordance with claim 1, wherein said means for producing the pressure or vacuum with relation to the water level comprises a front tank.

4. The wave turbine in accordance with claim 1, wherein said means for connecting the omnidirectional turbine to the generator comprises an axle.

5. The wave turbine in accordance with claim 1, wherein said means for producing the torque in combination with the outer turbine comprises an inner turbine.

6. The wave turbine in accordance with claim 1, wherein said means for producing torque output in one direction, with bidirectional air pressure comprises an omnidirectional turbine.

7. The wave turbine in accordance with claim 1, wherein said means for holding the axle to the connecting tube comprises an upper ball bearing.

8. The wave turbine in accordance with claim 1, wherein said means for holding the axle to the frame comprises a middle ball bearing.

9. The wave turbine in accordance with claim 1, wherein said means for holding the axle to the frame comprises a lower ball bearing.

10. The wave turbine in accordance with claim 1, wherein said means for holding the omnidirectional turbine to the connecting tube and to make the omnidirectional turbine fit the connecting tube, so that air pressure will not leak between the connecting tube and the omnidirectional turbine comprises a frame.

11. The wave turbine in accordance with claim 1, wherein said means for producing vacuum or air pressure with relation to the water level comprises a rear tank.

12. The wave turbine in accordance with claim 1, wherein said means for the transfer of kinetic energy through the water comprises a water wave.

13. The wave turbine in accordance with claim 1, wherein said means for the transfer of energy from the water wave to the omnidirectional turbine comprises an air pressure.

14. The wave turbine in accordance with claim 1, wherein said means for shielding or passing the air pressure to the inner turbine, and works in connection with the inner turbine to produce torque comprises an outer turbine.

15. The wave turbine in accordance with claim 1, wherein said means for changing mechanical energy to electrical energy comprises a generator.

16. The wave turbine in accordance with claim 1, wherein said means for supporting the wave turbine to the ocean floor comprises a supporting leg.

17. The wave turbine in accordance with claim 1, wherein said means for attaching the generator to the wave turbine comprises a stud.

18. The wave turbine in accordance with claim 1, wherein said means for holding together the inner turbine and outer turbine that make up the omnidirectional turbine comprises a plate.

19. A wave turbine for generating power from wave variation of sea water or any large body of water, comprising:
- a connecting tube, for connecting and directing two tanks and holding an omnidirectional turbine and directing an air pressure to pass through the omnidirectional turbine;
- a front tank, for producing the pressure or vacuum with relation to the water level;
- an axle, for connecting the omnidirectional turbine to a generator;
- an inner turbine, for producing a torque in combination with an outer turbine;
- an omnidirectional turbine, for producing torque output in one direction, with bidirectional air pressure;
- an upper ball bearing, for holding an axle to a connecting tube;
- a middle ball bearing, for holding the axle to a frame;
- a lower ball bearing, for holding the axle to the frame;
- the frame, for holding the omnidirectional turbine to the connecting tube and to make the omnidirectional turbine fit the connecting tube, so that air pressure will not leak between the connecting tube and the omnidirectional turbine;
- a rear tank, for producing vacuum or air pressure with relation to the water level;
- a water wave, for the transfer of kinetic energy through the water;
- an air pressure, for the transfer of energy from the water wave to the omnidirectional turbine;
- the outer turbine, for shielding or passing the air pressure to the inner turbine, and works in connection with the inner turbine to produce torque;
- the generator, for changing mechanical energy to electrical energy;
- a supporting leg, for supporting the wave turbine to the ocean floor;
- a stud, for attaching the generator to the wave turbine; and
- a plate, for holding together the inner turbine and outer turbine that make up the omnidirectional turbine.

* * * * *